Oct. 18, 1966        D. W. HALUN        3,279,557
PROTECTIVE COVER FOR AUTOMOBILE UNDERBODY
Filed April 15, 1964
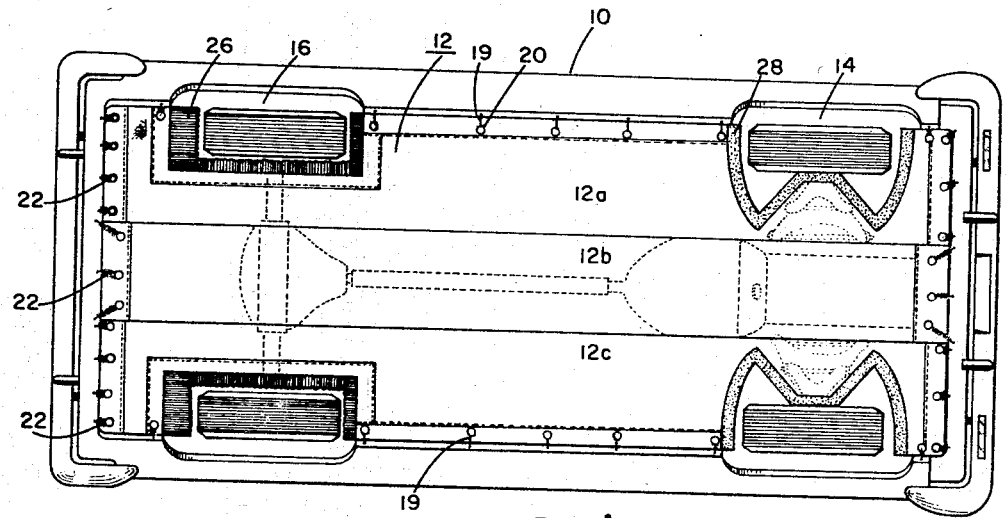
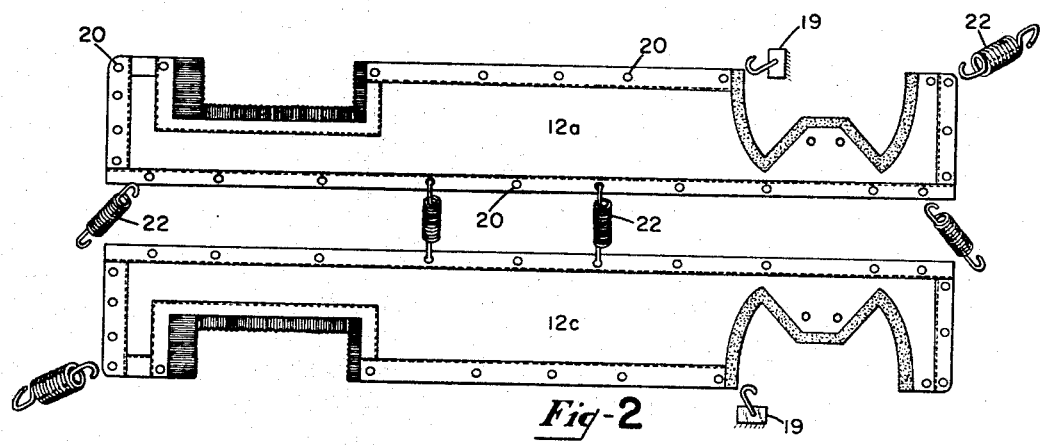
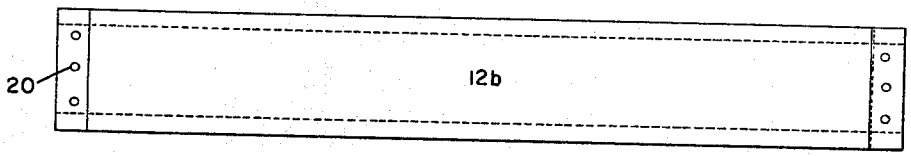
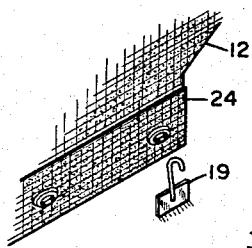
INVENTOR.
DANIEL W. HALUN
BY
ATTORNEY

United States Patent Office 3,279,557
Patented Oct. 18, 1966

3,279,557
PROTECTIVE COVER FOR AUTOMOBILE
UNDERBODY
Daniel W. Halun, 4729 E. 143rd St., Cleveland, Ohio
Filed Apr. 15, 1964, Ser. No. 359,964
7 Claims. (Cl. 180—69.1)

This invention relates generally to a cover for automobile underbody and more particularly to a cover for protecting the bottom portion of an automotive vehicle.

For years now, and particularly in recent years, salt has been used as a media for melting road ice. The salt causes formation of harmful acids which attack the metal surface of the automobile and results in extensive depreciation of automobile values. Such deleterious acids, formed by the coaction with slush, water, or road slag, come predominantly in contact with the bottom surface of the automobile sheet steel and the mechanized parts located proximate thereto.

As a result, a rapid deterioration of the sheet metal takes place and, moreover, such undesirable substances destroy the lubricants required for the proper operation of the engine, transmission, and associated parts.

It is therefore the primary object of this invention to provide a durable protective cover which will eliminate, or at least substantially reduce, the deterioration of the entire bottom surface of the vehicle.

It is a further object of this invention to provide a cover which is adapted to be maintained in a resilient but taut condition and which will protect the necessary lubricants or moving engine and transmission parts from slush, water, and road slag.

It is another object of this invention to reduce the effect of engine noise.

It is still another object of this invention to provide a cover which can be readily attached and removed to facilitate servicing of the engine and transmission.

It is still another object of this invention to provide a cover which is adapted to use engine heat to melt ice and snow which may have formed proximate to the fenders, the rocker panels or between the cover and the automotive vehicle.

An aspect of the present invention resides in the provision of a protective cover for a vehicle which has a rectangularly shaped underbody. This cover includes a flat sheet of material which is juxtaposed to the underbody of the vehicle; the sheet substantially covers the entirety of the vehicle underbody. Attaching members are provided to fasten the rim or periphery of the cover to the underbody, these members include a plurality of springs, which are suitably spaced along the rim for resiliently fastening the ends of the flat sheet of material to the corresponding ends of the underbody parallel the minor axis thereof, as well as a plurality of fastening devices, such as hooks, for fixedly attaching the sides of the flat sheet to the underbody parallel the rim, or outer periphery, of the major axis.

Other objects and a fuller understanding of the present invention may be had by referring to the following description and claims, taken in conjunction with the accompanying drawings in which:

FIGURE 1 is a bottom plan view of the underside of a typical automotive vehicle employing the invention;

FIGURE 2 is a view similar to FIGURE 1 illustrating two remote sections of the invention together with typical attachments therefor;

FIGURE 3 is a plan view of a center section of the protective cover;

FIGURE 4 is a detailed view showing a typical cover section and attaching means.

Referring now to the drawing, there is shown in FIGURE 1 a late model conventional passenger automobile 10. The invention as hereinafter described is adapted to be employed for automobiles of all types or models, although various modifications within the ordinary skill of those trained in the art may be necessary to adapt the same to the particular configuration of a given automobile. For purposes of reference the underbody of the automobile 10 has been defined as extending from front to rear bumper along the major axis of the generally rectangular configuration, while the width of the automobile extends along the minor axis thereof.

The invention is embodied in a cover 12 which comprises a generally flat sheet of material, preferably composed of three independent sections 12a, 12b, and 12c, which are disposed parallel to the aforementioned major axis of the underbody. In combination, these sections cover the entirety of the underbody generally coplanar with the configuration of the underbody. Similarly, the periphery or rim of the remote sections 12a and 12c follows the contour of the underbody, insofar as possible, to form an enclosure around front and rear wheels 14 and 16, respectively. In the case of the front wheels, it is necessary to provide sufficient space to avoid interference with the movability of the wheels 14.

The remote portions of the cover, 12a and 12c, and more particularly the rim portions thereof along the major axis of the underbody, are secured to the underbody 10 by means of fastening members 19, such as hooks or the like, which are rigidly attached to the body or frame of the automobile and secured to an eyelet 20 provided at spaced intervals along the rim of these sections. It is preferable, that these fasteners 19 are spaced at intervals of about 6 to 14 inches to secure the cover along the rim of the major axis in a nonresilient fashion. The ends of all three sections of the cover 12, along the outer rim parallel to the minor axis of the automobile, are likewise provided with eyelets 20 to secure these outer ends resiliently to the bumpers or some other parts of the automobile. Preferably, this is accomplished by using attaching means, such as a spring 22, and fastening one end of the spring to the eyelet 20 and securing the opposite end of the spring 22 to either an opening in the automobile or to some receiving means, such as a hook (not shown), suitably secured to the automobile. It is essential however, that the cover 12 be resiliently attached to the ends of the automobile to absorb the dynamic stresses and shocks which are common to the operation of an automobile. The type of means used for attaching either fastening member 19 or spring 22 is not very material and numerous conventional devices may be satisfactorily used for this purpose.

In order to enhance the flexibility and provide the necessary stretch to keep the cover firm and taut, the center section 12b of the cover is disposed in an overlapping relationship to the two remote sections 12a and 12c. It has been found, that 6 to 10 inches of overlap on each side is adequate. The remote sections 12a and 12c are resiliently connected by means of springs 22, as shown in FIGURE 2. The sections 12a and 12c are provided with eyelets 20 extending, at spaced intervals, along the center rim and the springs are fastened thereto and are arranged in a direction parallel to the minor axis of the automobile disposed transversely across the center and underneath cover 12b. It will be readily appreciated that the multiple section cover as above described, facilitates a simple removal of the center section 12b, shown in FIGURE 3, when it is necessary to service the engine or the transmission of the automobile.

The cover 12 is formed of a noncorrosive material, such as plastic, fiberglass, galvanized steel, aluminum or copper. However, in the preferred embodiment of this invention, the cover 12 is composed of aluminum wire mesh approximately 1/32 to 1/16 inches in size and is embedded in or impregnated by a waterproofing material, as shown in FIGURE 4. The screen is coated with a suitable bonding agent, such as cement for polar rubbers, for bonding the aluminum to a rubber-like material 24 which surrounds the aluminum screen. While the aluminum screen may be completely encapsulated in a rubber mold or matrix, thus obviating the need for a bond between the aluminum and the rubber matrix, the invention is also operative when the little screen openings are merely closed by a waterproofing material. The point to be observed, however, is that as the amount of rubber or like material is reduced, the requirement for a proper bond between the rubber-like substance and the aluminum is increased.

In some instances it may be desirable to attach some asbestos insulation (not shown) to the cover where the latter comes in contact with any hot part of the exhaust system. Similarly, it is desirable, in some instances, to reinforce some sections of the cover where excessive wear occurs. This can be accomplished with any durable material. These requirements will vary, of course, from one automobile model to another.

The rim portions of the remote sections 12a and 12c adjacent to the rear wheels 16 are lined with a strip of bristle board 26 of a plastic or rubberlike material, see FIGURES 1 and 2. The rim sections facing the forward wheels 14 are lined with a resilient rubber-like strip 28. Both of these attachments serve to reject and break up the snow and ice which may form proximate to the wheels and tires of this automobile.

As has been noted above, the dimensional requirements will differ somewhat from one automobile model to another. Similarly, in certain cases it may be desirable to provide cutouts within the cover and to let bolts or other accessories protrude therethrough to avoid excessive wear. A rubber bushing (not shown) may be inserted in the opening for sealing.

While there have been described what at present are considered to be the preferred embodiments of this invention, it will be obvious to those skilled in the art that various changes and modifications may be made therein without departing from the invention, and is aimed therefore, in the appended claims to cover all such changes and modifications as fall within the true spirit and scope of the invention.

I claim:
1. A protective cover for a vehicle underbody, comprising:
   a flat sheet composed of a wire mesh material impregnated with a flexible waterproof coating juxtaposed to said underbody and substantially covering the entirety thereof;
   and attaching means for securing said flat sheet of material to said underbody.

2. A protective cover for a vehicle underbody of the type having forward and rear movable wheels to mount tires, comprising:
   a flat sheet of material juxtaposed to the underbody of said vehicle substantially covering the entirety of said underbody, said flat sheet of material being formed substantially complementary to and coplanar with the configuration of the underbody, including the rim portion of said flat sheet proximate to said movable wheels;
   bristle means attached to and extending alongside of said rim portion of said flat sheet adjacent to at least one pair of said movable wheels;
   and attaching means including a plurality of spring members for resiliently fastening the ends of said flat sheet to the ends of said underbody along the minor axis thereof and a plurality of fastening members for fixedly attaching the sides of said flat sheet to said underbody along the major axis thereof.

3. A protective cover for a vehicle underbody of the type having forward and rear movable wheels to mount tires, comprising:
   a flat sheet of material juxtaposed to the underbody of said vehicle substantially covering the entirety of said underbody, said flat sheet of material being formed substantially complementary to and coplanar with the configuration of the underbody, including the rim portion of said flat sheet proximate to said movable wheels;
   bristle means attached to and alongside of said rim portion of said flat sheet adjacent to said movable rear wheels; and a strip of flexible material attached to and extending alongside of said rim portion of said flat sheet adjacent to said movable forward wheels.

4. A protective cover for a vehicle underbody, comprising:
   a flat sheet composed of a wire mesh material impregnated with a flexible waterproof coating juxtaposed to said underbody and substantially covering the entirety thereof, said flat sheet including three independent sections disposed parallel to the major axis of said underbody, and being formed substantially complementary to and coplanar with the configuration of the underbody including the rim portion of said flat sheet proximate to said movable wheels;
   attaching means including a plurality of spring members for resiliently fastening the ends of said flat sheet to the ends of said underbody parallel to the minor axis thereof and a plurality of fastening members for fixedly attaching the sides of said flat sheet to said underbody parallel the major axis thereof;
   bristle means attached to and extending alongside of said rim portion of said flat sheet adjacent to said movable rear wheels;
   and a strip of flexible material attached to and extending alongside of said rim portion of said flat sheet adjacent to said movable forward wheels.

5. A protective cover for a vehicle having a rectangularly shaped underbody, comprising:
   a flat sheet of material juxtaposed to the underbody of said vehicle substantially covering the entirety of said underbody;
   said sheet being composed of at least three independent sections disposed parallel to the major axis of said underbody;
   and attaching means including a plurality of spring members for resiliently fastening the ends of said flat sheet to the end of said underbody along the minor axis thereof and a plurality of fastening members for fixedly attaching the sides of said flat sheet to said underbody along the major axis thereof.

6. A protective cover according to claim 5, wherein said three independent sections are composed of two remote sections and one center section, said center section being in marginally overlapping relationship to said remote sections.

7. A protective cover according to claim 6, and a plurality of spring members resiliently fastened to and between said remote sections and disposed parallel to said minor axis at spaced intervals sufficient to maintain tautness between said remote section.

References Cited by the Examiner
UNITED STATES PATENTS

| | | | |
|---|---|---|---|
| 1,163,317 | 12/1915 | Brush | 180—69.1 |
| 1,630,639 | 5/1927 | Taylor | 184—106 |
| 2,171,813 | 9/1939 | Stockstrom | 180—69.1 XR |
| 3,732,024 | 1/1956 | Schonwald | 180—69.1 |

FOREIGN PATENTS 497,449   5/1930   Germany.

BENJAMIN HERSH, Primary Examiner.

MILTON L. SMITH, Examiner.